United States Patent [19]
Gotthelf et al.

[11] Patent Number: 5,890,512
[45] Date of Patent: Apr. 6, 1999

[54] CNG REGULATOR

[75] Inventors: Jeffrey Bryan Gotthelf, Summerville; Charles Walter Otap, St. George, both of S.C.; Edward W. Peters, Belleville, Mich.

[73] Assignees: ITT Corporation, New York, N.Y.; Ford Motor Company, Detroit, Mich.

[21] Appl. No.: 554,115

[22] Filed: Nov. 6, 1995

[51] Int. Cl.⁶ ................................................. G05D 16/06
[52] U.S. Cl. ................ 137/484.6; 137/375; 137/505.11; 137/505.42
[58] Field of Search ............................ 137/505.42, 484.6, 137/484.8, 375, 505.11

[56] References Cited

U.S. PATENT DOCUMENTS

| | | | |
|---|---|---|---|
| 1,945,834 | 2/1934 | Terry | 137/484.6 X |
| 2,005,445 | 6/1935 | Wiedhofft | 137/505.42 X |
| 2,890,713 | 6/1959 | Semon | 137/484.8 |
| 4,471,802 | 9/1984 | Pryor | 137/454.2 |
| 4,719,940 | 1/1988 | Beavers | 137/505.42 |

*Primary Examiner*—Stephen M. Hepperle
*Attorney, Agent, or Firm*—Menotti J. Lombardi

[57] ABSTRACT

High pressure natural gas enters the regulator at the inlet port and is directed through a filter to a passage in the valve body and into the inner chamber of the valve body. The valve means which controls the high pressure gas as it expands past a valve seat and into the low pressure chamber of the regulator body, is spring mounted in a bushing to prevent undesired vibrations. The expanded and colder low pressure natural gas is directed through a nozzle to the outlet port of the regulator body. The outlet port has a bypass orifice that leads to the diaphragm chamber. Pressure variations in the diaphragm chamber control the movement of the valve means coupled to the diaphragm means.

8 Claims, 3 Drawing Sheets

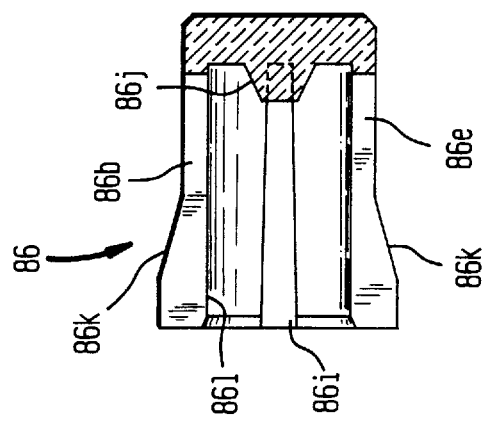
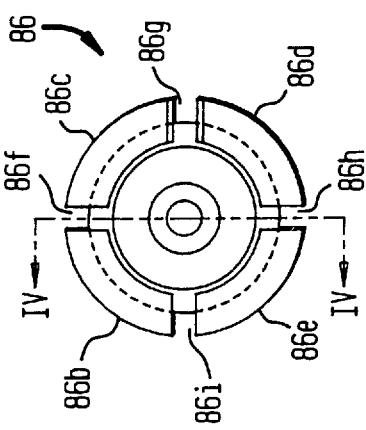
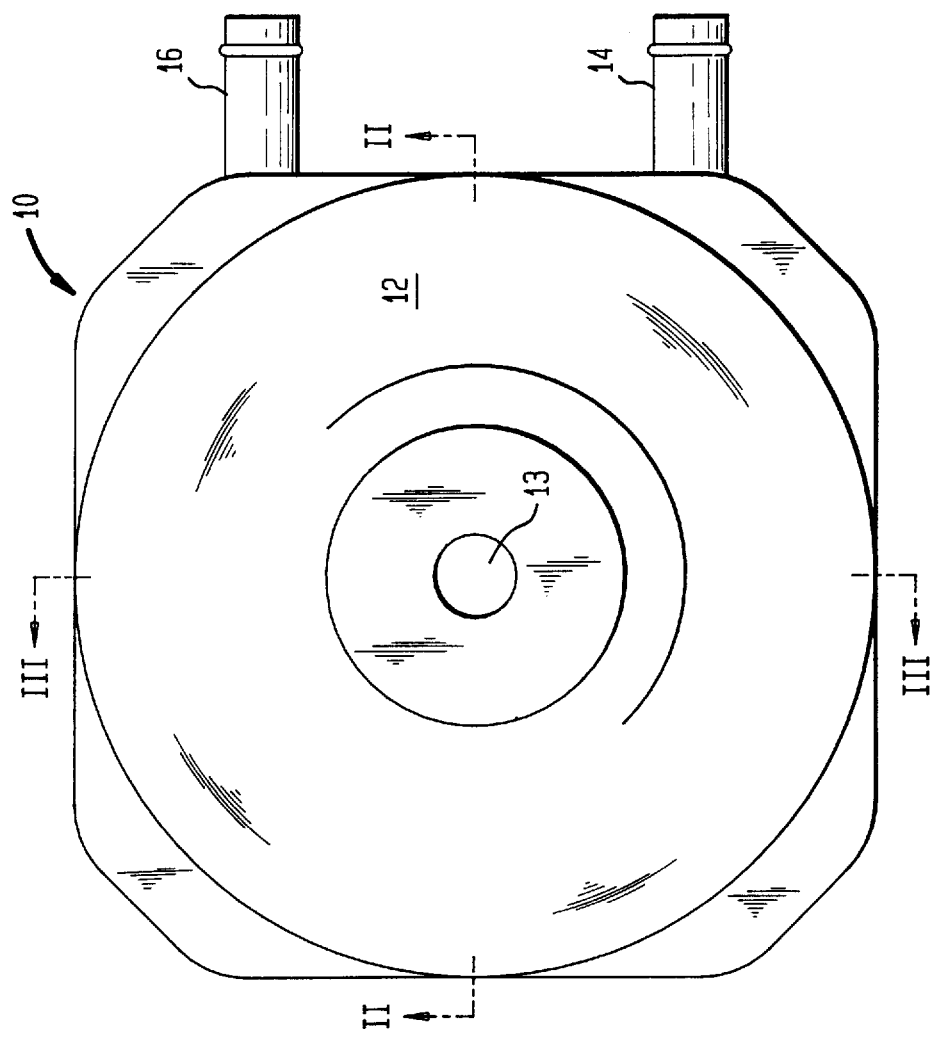

CNG REGULATOR

BACKGROUND OF THE INVENTION

This invention relates to a pressure-reducing regulator for compressed natural gas (CNG), and more particularly to an improved CNG regulator for vehicular engines.

In U.S. Pat. No. 5,285,810, issued Feb. 15, 1994, there is described a pressure-reducing regulator having a balanced valving element arrangement with minimal friction drag. The valving element cooperates with internal structure to provide seating and sealing areas between high and low pressures of the natural gas, and the magnitudes and directions of the differential pressures are balanced at the seating and sealing areas.

U.S. Pat. No. 5,381,819, issued Jan. 17, 1995, was a division of application Ser. No. 08/016,376 which issued as U.S. Pat. No. 5,285,810. In this patent there is described another embodiment of the balancing valve in which the natural gas can flow directly to an outlet port rather than have the gas work against the diaphragm. This is beneficial where there are high flow rates of the natural gas and the possibility of diaphragm oscillation or instability.

In application Ser. No. 08/230,587, filed Apr. 21, 1994, which was a continuation-in-part of copending application Ser. No. 08/143,010, now U.S. Pat. No. 5,381,819, there is described a regulator having a valving element that is positively tied to the pressure-sensing and pressure-responsive diaphragm. The arrangement permits relative angular displacement between the valving element and the diaphragm and prevents cocking of the element in its axial movement. This regulator arrangement, although an efficient and uncomplicated design and effective in vehicle applications, may under certain flow rates generate an unwelcomed low level audible noise. While such a noise does not effect performance, reliability, or safety, it could raise an unnecessary concern for the vehicle operator.

Accordingly, the potential for audible noise generation which could arise under certain regulator conditions is eliminated by the improved regulator of the invention.

SUMMARY OF THE INVENTION

An object of the invention is to provide an improved regulator which meets the requirements of low or inaudible noise under a wide range of flow rates.

According to the broader aspects of the invention, a pressure-reducing regulator has a body with an inner chamber for receiving a high-pressure compressed gas and an outer chamber for receiving a low-pressure, compressed gas, valve means movably disposed and stabilized within said body controls the flow between said chambers, and diaphragm means coupled to the valve means is provided for sensing pressure in one of said chambers and effecting movement of the valve means.

BRIEF DESCRIPTION OF THE DRAWINGS

Further objects of this invention, as well as novel features thereof, will become apparent by reference to the following description taken in conjunction with the accompanying drawings in which:

FIG. 1 is a top plan view of the regulator according to the invention;

FIG. 4a is a cross-section view of the bushing according to the invention taken along section IV—IV of FIG. 4b which is a planar end view thereof.

DETAILED DESCRIPTION OF THE PREFERRED EMBODIMENT

Figure 2:
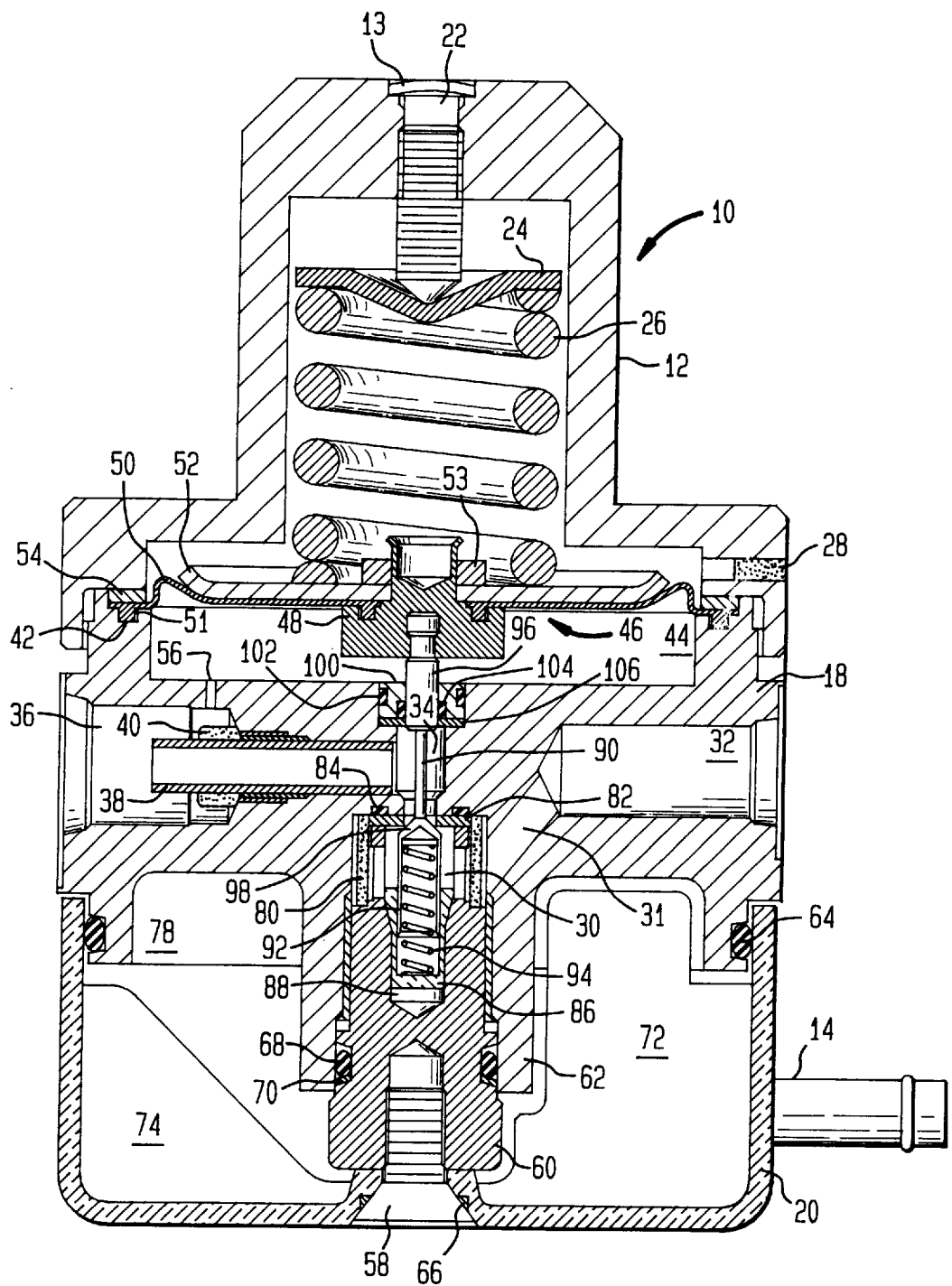
FIG. 2 is a cross-sectional view of the regulator of FIG. 1 taken along section II—II of FIG. 1.

Referring to FIG. 1, there is shown a top plan view of the regulator 10 having a bonnet 12 with a spherical plug cover 13. Coolant inlet port 14 and coolant outlet port 16 accommodate the inflow and discharge of a heating fluid, such as an antifreeze coolant from the vehicle coolant system. The temperature of the coolant which passes through the bowl of the regulator may be controlled, if desired, by a thermostat element in the outlet port line located either before or after the outlet port, according to known techniques.

Referring additionally to FIG. 2, there is shown a cross-sectional view of the regulator of FIG. 1 taken along section II—II of FIG. 1. The regulator 10 has a bonnet 12, a regulator body 18, and a bowl 20. The bonnet 12 which is threadedly engaged with the body 18 includes the plug cover 13, a hex top screw 22, a spring button 24 for transferring the loading from the screw to a spring 26, and a porous plug 28. The bonnet, body, and bowl may be fabricated of aluminum and coated to prevent corrosion, or fabricated from a corrosive resistive material. The screw, spring button, and spring are preferably fabricated of stainless steel for its corrosive resistant properties. The plug 28 is formed of polytetra-flouorethylene which is sufficient to permit atmospheric pressure to enter the bonnet, but prevents an intrusion of water such as splashing from roadways and the like.

The regulator body 18 has an inner chamber 30 for receiving high-pressure, compressed, natural gas therewithin from a gas inlet port 32 and a connecting passageway 31. The body also has an outer chamber 34 for receiving low-pressure, compressed, natural gas therewithin. The outer chamber 34 connects with a gas outlet port 36 by means of a plastic nozzle 38 which extends into port 36 and is retained in place by means of an aluminum retaining nut 40 threadedly engaged with body 18.

The uppermost surface of body 18 has a circular groove 42 formed therein. Diaphragm means 46 comprises a diaphragm insert 48, a diaphragm 50 with a peripheral rib 51, a diaphragm plate 52, and a plate nut 53. The diaphragm 50 and the body 18 forms a diaphragm cavity or chamber. The insert, plate and nut are fabricated of stainless steel for corrosion resistance, and the diaphragm is preferably a Buna-N with dacron reinforcement. Rib 51 is nested in groove 42 and a bearing ring 54 surmounts the periphery of diaphragm 50.

An aspirator hole or bypass orifice 56 communicates the gas pressure in the outlet port 36 with the side of diaphragm 50 which faces the diaphragm chamber 44 in the regulator body 18.

The regulator body 18 has the bowl 20 attached thereto by means of a screw 58 which is screwed into a valve body 60 threadedly engaged into cylindrical sleeve portion 62 of body 18. An O-ring 64 is positioned between bowl 20 and body 18, and an O-ring 66 is positioned under the head of screw 58. O-ring 68 is positioned on a teflon back-up ring 70 of valve body 60. The valve body is fabricated from aluminum with a corrosion resistive coating and screw 58 is stainless steel.

Figure 3:
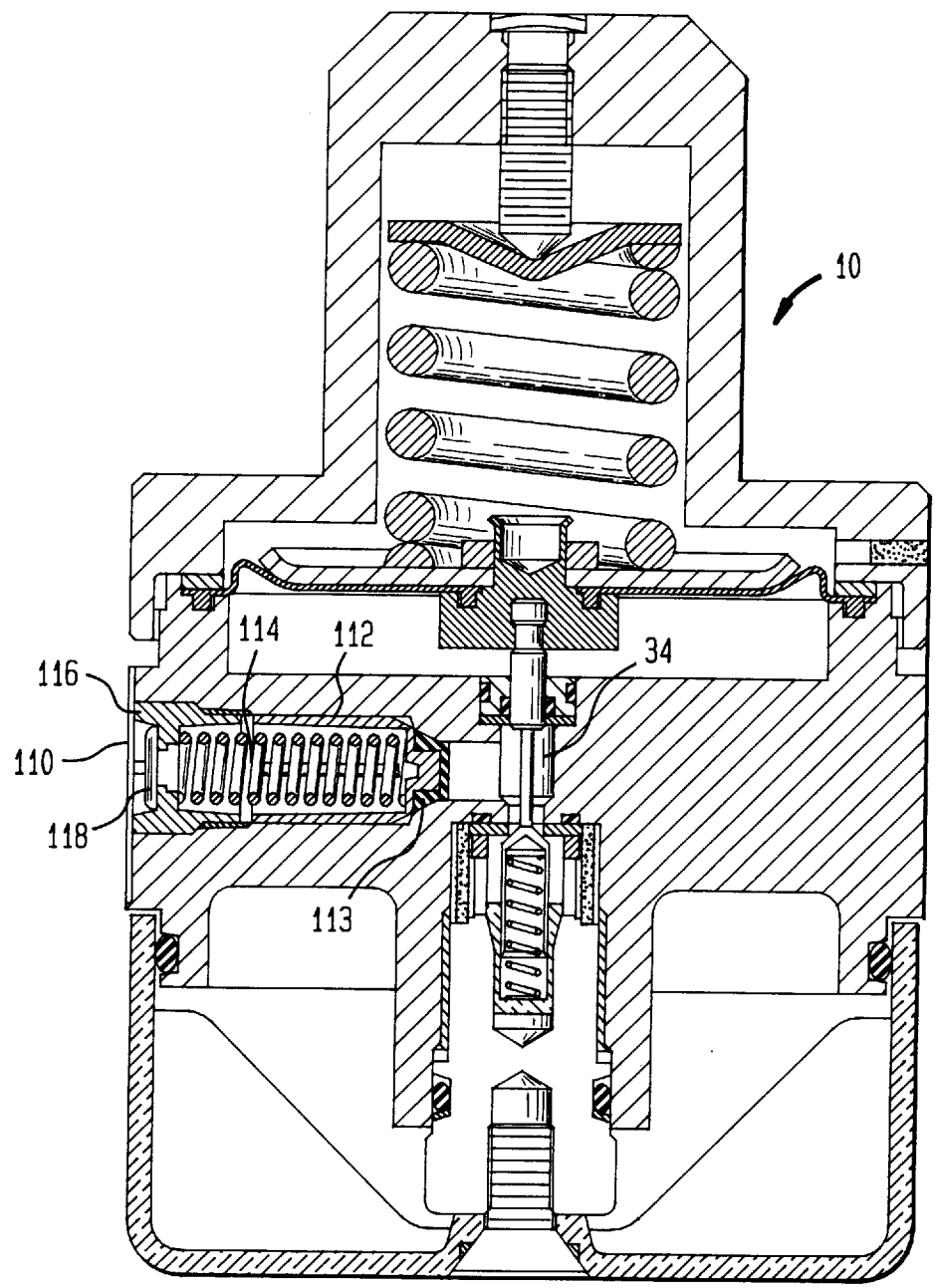
FIG. 3 is a cross-sectional view of the regulator of FIG. 1 taken along section III—III of FIG. 1.

The bowl 20 includes a high rib 72 and two low ribs 74, 76 (rib 76 is shown in FIG. 3). The uppermost portion of rib 72 is received between splines 78 formed in the bottom of regulator body 18. The coolant which passes through the bowl is thus forced to flow by high rib 72 over lower ribs 74, 76 and around cylindrical sleeve portion 62 and out port 16.

A cylindrical filter 80 is positioned around the inner chamber 30 to prevent any containments from entering inner chamber 30. Filter 80 is preferably a sintered nylon filter to avoid corrosion. A plastic seat 82 and an O-ring 84 are positioned at the bottom of cylindrical sleeve portion 62. The seat 82 is preferably a polyimide plastic.

A plug bushing 86 having a taper at one end and a cylindrical interior is inserted into the tapered and cylindrical bore 88 of valve body 60. A valving element 90 has a central shank with a tubular body 92 on one end for containing a valving spring 94, and a valve plug 96 on the other end terminating in the diaphragm insert 48. The tubular body 92 has a conical top 98 connected to the central shank, the conical top 98 contacts seat 82 to separate the inner chamber 30 from the outer chamber 34.

The valve plug 96 slidably passes through plug guide 100 which includes O-rings 102, 104. Guide 100 is positioned on stainless steel washer 106. The tapered plug bushing 86 is preferably fabricated of a PEEK material (any other self-lubricating material of suitable strength, temperature and chemical resistance, such as Torlon polyamide-imide, may also be used), and the valving element of a heat treat hardened stainless steel (RC 37-40). The plug guide is brass and the washer is also stainless steel to prevent corrosion.

The plastic nozzle 38 extends beyond the aspirator hole 56 to prevent the cold gas from the outer chamber from entering directly into the hole 56. This arrangement of nozzle and aspirator hole provides a pressure drop flow which helps keep the gas pressure output more uniform with increase flow rates. The regulator is designed to operate with compressed natural gas at 250–3600 PSIG inlet pressure and a 99–125 PSIG output pressure at a nominal 110 psig setting.

The nozzle is made of a plastic material so that it acts as a thermal barrier between the cold outlet gas and the aluminum regulator body. This barrier protects the diaphragm from extreme cold until the engine coolant can warm the regulator. The nozzle is used as a way to correct regulator droop (droop is the decreasing output pressure with an increase in flow). Without the nozzle, the gas can expand as soon as it exits the bypass hole (where the nozzle is located). With the nozzle, the gas velocity and expansion (pressure drop) can be better controlled. The fluid dynamics with the nozzle in place create a "venturi" or "jet pump" effect, which exposes the aspirator hole to a slightly lower pressure. The lower pressure is communicated into the diaphragm chamber and makes the regulator "think" that the output pressure is lower than it truly is. In this respect, the diaphragm moves further down, the valve opens slightly more, and the regulated output pressure increases slightly to maintain the dynamic equilibrium. With the higher output pressure at higher flows, the regulator corrects for line pressure loss at these flows. Essentially, the regulator compensates somewhat for the system losses in the vehicle, and provides improved pressure control for the fuel system.

Referring now to FIG. 3, there is shown the pressure relief device for the regulator 10. A pressure relief port 110 is connected to outer chamber 34. Positioned in port 110 is a high strength plastic (PPA-polypthalamide) poppet 112 with an integral molded rubber tip 113. Poppet 112 has a cylindrical interior for containing a portion of poppet stainless steel spring 114. A nylon poppet adjusting screw 116 is threadingly engaged in the port 110 and has a cylindrical interior to contain a portion of the poppet spring 114. A plastic dust cover 118 is inserted into the poppet screw.

When the pressure in outer chamber 34 is greater than a predetermined amount, poppet 112 will compress spring 114 causing dust cover 118 to pop and release the gas to the atmosphere.

Referring additionally to FIGS. 4a and 4b, the plug bushing 86 is illustrated. The bushing has a closed end 86a with four cylindrically shaped finger elements 86b, c, d, e formed by slots 86f, g, h, i. Although four finger elements have been used, two, three, or a multiple thereof could be used. The bottom interior portion of the bushing has a centrally located cone 86j for centrally positioning the valving spring. The four finger elements have tapered ends 86k to complimentary fit the tapered and cylindrical bore 88 (FIG. 2). The valve spring preloads the bushing via the tapered edge of the bushing against the bore taper of the valve body. The slots in the bushing allow the bushing I.D. 86l to adjust smaller as the bushing slides into the tapered valve body bore. This permits easy assembly while creating an interference fit bushing with a self-adjust feature. The PEEK plastic material chosen for the bushing is self-lubricating and does not interfere with the regulator performance.

The pressure regulator is designed to safely reduce the pressure of compressed natural gas (CNG) from a vehicle storage tank (up to 3600 PSIG) to a preset level which allows an engine fuel metering system to properly control the gas. This is accomplished by the pressure sensing element and controlled force moving the valve element to regulate gas flow in response to down stream pressure levels. The valving element provides stable flow for various operating conditions and the diaphragm provides precise sensing. The valving element permits controlled gas flow between the high-pressure inner chamber, and the low-pressure outer chamber, through a gap between the conical top portion of the valving element and the valve seat. To prevent moisture and ice accumulation problems, the regulator has a coolant bowl to permit circulation of engine coolant around the valve chamber.

In operation, with no demand (closed condition) on gas outlet 36, the pressure in diaphragm chamber 44 builds to equal pressure in outlet 36. The higher pressure is sensed in diaphragm chamber 44 and diaphragm means 46 pushes against spring 26. Insert 48 pulls valve plug 96 until the conical top portion 98 of the valving element 90 seats against seat 82 sealing off the inner chamber 30 from the outer chamber 34.

When there is a gas demand (open condition) in the outlet port 36, the pressure in diaphragm chamber 44 decreases to equal the pressure in outlet 36. The lower pressure is sensed in chamber 44 and the spring 26 pushes against diaphragm means 46 causing movement of valving element 90 and an opening of a gap between the seat 82 and the conical top portion 98 of the valving element. The gap opening will be in proportion to the drop in pressure in diaphragm chamber 44. The movement of the valving element maintains a condition of equilibrium between the outlet and the diaphragm chamber.

The valving element movement is also stable and free of any unwelcomed low level audible noise due to its improved configuration. In other designs, the high pressure natural gas expanding across the valve seat caused valve plug vibration resulting in emission of an audible noise. The inventive configuration includes a valving element 90 which has at one end a tubular body 92 enclosing a valving spring 94, the body and spring being contained within a bushing tapered at one end and inserted into the valve body. This arrangement of bushing, tubular body, and spring captured therebetween provides the stabilizing means for retaining the high pressure end of the valving element stable to prevent vibration and eliminate the low audible noises from the regulator.

While the present invention has been disclosed in connection with a preferred embodiment thereof, it should be understood that there may be other embodiments which fall within the spirit and scope of the invention as defined by the following claims.

We claim:

1. A pressure-reducing regulator comprising:

a regulator body having (a) an inner chamber for receiving high-pressure, compressed, natural gas therewithin and (b) an outer chamber for receiving low-pressure, compressed, natural gas therewithin;

an inlet port for admitting gas into said inner chamber;

an outlet port for discharging gas from said outer chamber;

valving means comprising a valve spring and a valving element having a plug portion, a stem portion, and a tubular portion, said means movably disposed within said body, for controlling gas flow between said chambers;

diaphragm means, coupled to said valving means, for (a) sensing outlet gas pressure, and (b) effecting movement of said valving means; and bypass means coupled between said outlet port and said diaphragm means for communicating a pressure indicative of said outlet gas pressure at said bypass means to said diaphragm means;

wherein said regulator body includes a pressure port connected to said outer chamber and poppet means in said outer chamber responsive to pressures in said outer chamber;

a valve body located within a bore in said regulator body, and said valve body having a cylindrical bore for positioning a slotted bushing therein;

wherein said tubular portion of said valving element and said valve spring are mounted within said bushing; and wherein said slotted bushing has tapered sleeves at one end and is closed at the opposite end to retain said valve spring.

2. The pressure-reducing regulator according to claim 1 wherein said poppet means includes a poppet with a molded tip.

3. The pressure-reducing regulator according to claim 2 wherein said poppet means includes a poppet screw and a poppet spring contained within and between said poppet and poppet screw.

4. The pressure-reducing regulator according to claim 3 including a dust cover positioned in said poppet screw.

5. A pressure-reducing regulator comprising:

a regulator body; having (a) an inner chamber for receiving high-pressure, compressed, natural gas therewithin and (b) an outer chamber for receiving low-pressure, compressed, natural gas therewithin;

an inlet port for admitting gas into said inner chamber;

an outlet port for discharging gas from said outer chamber;

valving means comprising a valve spring and a valving element having a plug portion, a stem portion, and a tubular portion, said means movably disposed within said body, for controlling gas flow between said chambers;

diaphragm means, coupled to said valving means, for (a) sensing outlet gas pressure, and (b) effecting movement of said valving means;

bypass means coupled between said outlet port and said diaphragm means for communicating a pressure indicative of said outlet gas pressure at said bypass means to said diaphragm means; and, a valve body having a cylindrical bore for positioning a slotted bushing, said valve body located within a bore of in said regulator body;

wherein said regulator body includes a pressure port connected to said outer chamber and poppet means in said outer chamber responsive to pressures in said outer chamber;

wherein said tubular portion and said valve spring are mounted within said slotted bushing; and, wherein said slotted bushing has tapered sleeves at one end and is closed at the opposite end to retain said valve spring.

6. The pressure-reducing regulator according to claim 5 wherein said slotted bushing is fabricated of a PEEK material.

7. The pressure-reducing regulator according to claim 6 wherein said slotted bushing has at least a plurality of cylindrically shaped finger elements.

8. The pressure-reducing regulator according to claim 7 wherein said slotted bushing has four cylindrically shaped finger elements.

* * * * *